Figure 1:
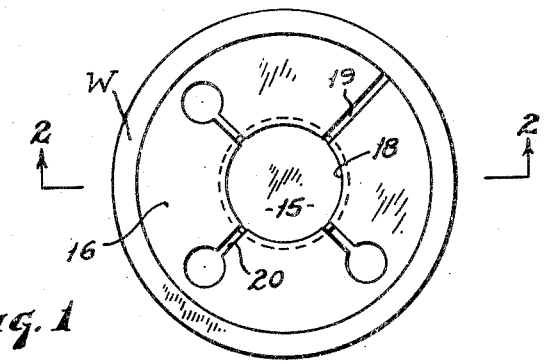

Oct. 4, 1949.　　　J. E. GILES　　　2,483,697
CLAMPING DEVICE

Filed March 12, 1946　　　2 Sheets-Sheet 1

INVENTOR.
JOHN E. GILES
BY
Bates, Teare, & McBean
ATTORNEYS

Oct. 4, 1949.　　　　　J. E. GILES　　　　　2,483,697
CLAMPING DEVICE

Filed March 12, 1946　　　　　　　　　　　2 Sheets-Sheet 2

INVENTOR.
JOHN E. GILES
BY
Bates, Teare, & McBean
ATTORNEYS

Patented Oct. 4, 1949

2,483,697

UNITED STATES PATENT OFFICE 2,483,697

CLAMPING DEVICE

John E. Giles, Diablo Heights, C. Z.

Application March 12, 1946, Serial No. 653,887

16 Claims. (Cl. 90—59)

This invention relates to clamping devices and particularly to clamps for holding non-magnetic workpieces on the magnetic chucks of machine tools.

Adequate clamping of bronze and other non-magnetic workpieces is a serious problem when such workpieces are to be machined on a surface grinder or other machine tool provided solely with a magnetic chuck for holding the work. The problem is particularly acute when the surface of a thin article is to be machined. The usual expedient resorted to is the blocking of the workpiece with steel blocks which are placed tightly against the work and which, being held by the magnetic chuck, are relied upon to prevent shifting. Such blocking must be below the level of the workpiece surface to be machined to avoid interference with the tool. Therefore, when grinding a flat plate or thin ring, for example, on a surface grinder, insufficient edge is presented by the blocks for adequate holding, as the blocks themselves must be extremely thin so as to lie below the path of the grinding wheel.

Another expedient is the clamping of the non-magnetic workpiece in a steel vise which may then be held by the chuck, but this method, also, is inapplicable in the holding of thin plates or other workpieces of small height where the broad surface is to be machined.

Grinding is not usually resorted to unless great accuracy is required and this accuracy cannot be realized unless the workpiece is held downwardly into firm engagement with the chuck surface. The "nest" provided by blocking pieces merely operates against lateral shifting and, with thin pieces, the vibratory action of the grinding wheel, while taking a cut even as small as one thousandth of an inch, will move the work up and down.

The matter of safety is involved since injury to the operator, as well as to the workpiece, may occur if the latter is insecurely held and is thrown from the machine by the tool while taking a heavy cut. Therefore, much time and energy is wasted, resulting in unnecessary expense, by performing many light machine operations where only a few heavier ones would be necessary if the workpiece were adequately held.

An object of the present invention is to provide a clamping device which will obviate the difficulties recounted and which will hold a workpiece with accuracy and safety.

Another object is to provide such a device which will be simple in form and extremely easy to use.

Other objects and advantages will be made apparent by the following specification and claims and the appended drawings.

These objects I accomplish by utilizing the principle of the wedge by providing a member of magnetic material which may contact the workpiece and which, on being drawn to the magnetic chuck, is forcibly wedged against the workpiece due to mating tapered surfaces on the member and on a second member also held by the chuck. Three preferred embodiments of this invention are shown for as many different kinds of workpieces.

Figure 2:
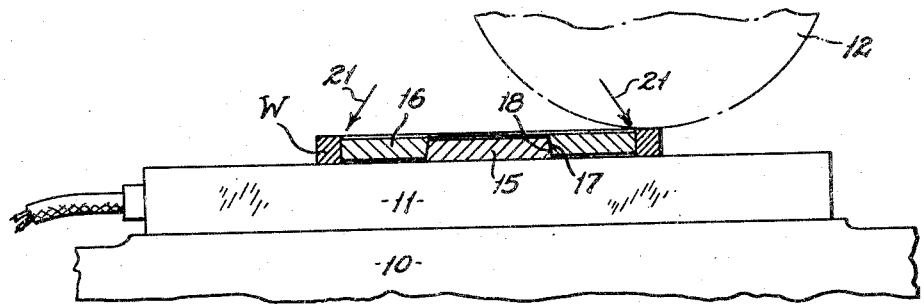
Figure 3:
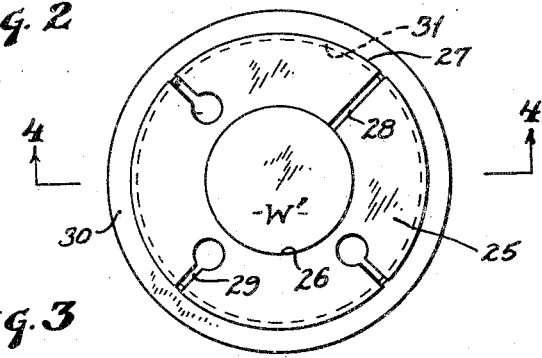
Figure 4:
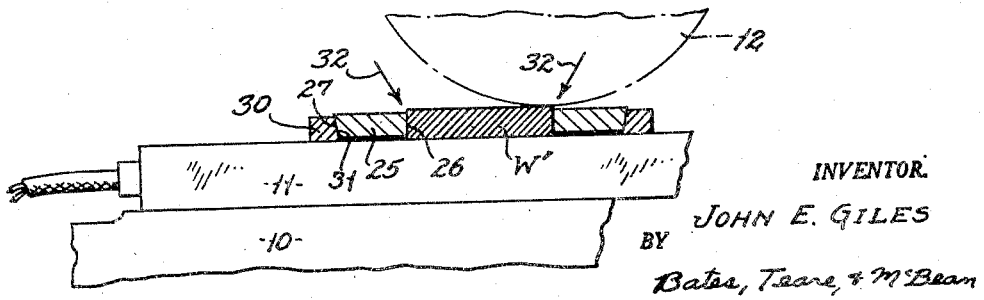
Figure 5:
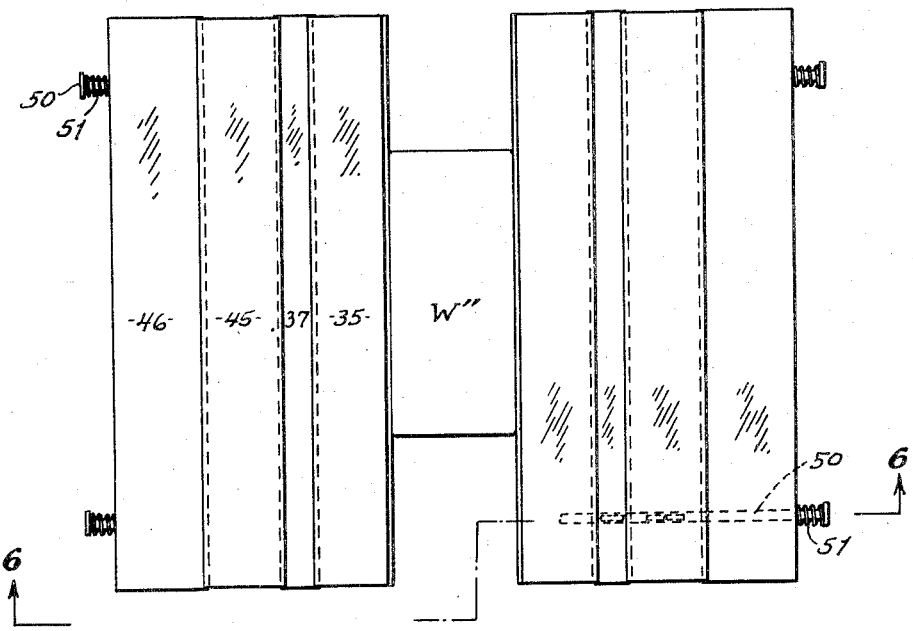
Figure 6:
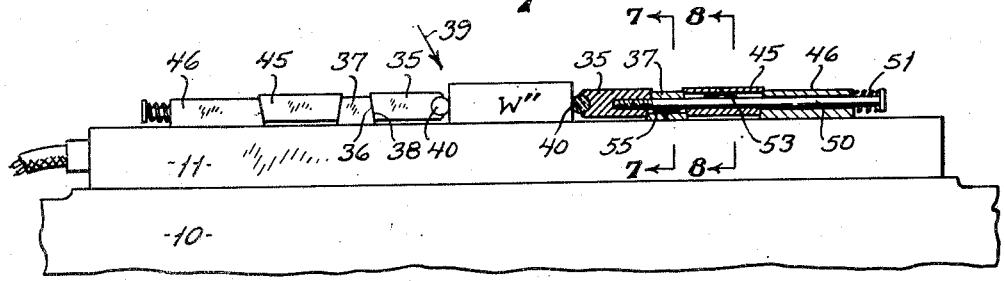
Figures 7, 8:
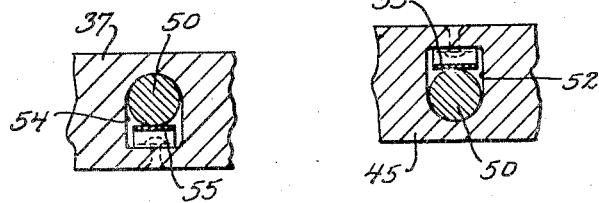

In the drawings, Fig. 1 is a plan view of my clamping device as applied to a thin ring; Fig. 2 is a transverse section taken on the line 2—2 of Fig. 1 and illustrating, in addition, the coacting chuck and grinding wheel; Fig. 3 is a plan view of a modified form of clamping device as applied to a flat disc; Fig. 4 is a transverse section taken on the line 4—4 of Fig. 3; Fig. 5 is a plan view of a third form of clamping device for use with a straight-edged workpiece; Fig. 6 is a transverse section taken on the offset line 6—6 of Fig. 5, and Figs. 7 and 8 are fragmentary sectional views taken on the correspondingly numbered lines in Fig. 6.

In Figs. 1 and 2, I have illustrated an embodiment of my invention in the form of a clamping device for a bronze, or other non-magnetic ring-shaped workpiece W. This ring is to be clamped firmly to the bed of a surface grinder 10 having a magnetic chuck 11 and the upper surface of the workpiece is to be ground by the wheel 12.

The clamping device comprises two steel pieces 15 and 16, the first of which is a plug or anchoring member in the form of a shallow truncated cone having a steeply sloped edge at 17. The member 16 is a ring having a close fit within the workpiece and provided with a tapered central aperture at 18 for coaction with the plug. The ring is split at 19 to allow it to expand within the workpiece and the required flexibility is obtained by the provision of a number of kerfs, as at 20, extending partly through the ring.

The use of this device is extremely simple and very effective. The plug 15 is laid upon the chuck and the ring 16 is placed within the workpiece and then upon the plug. The workpiece and plug are tapped into firm contact with the chuck 11 and the ring 16 is lightly tapped into clamping engagement. Electric current is then fed to the magnetic chuck and the resulting flux firmly positions the plug 15 against shifting of the device and the workpiece. The ring 16 is also forcibly drawn to the chuck and, in being so drawn, expands to bind radially against the workpiece and, through the resulting binding frictional engagement, urges the workpiece downwardly. The resultant force upon the workpiece is approximately in the direction indicated by the arrows 21 of Fig. 2.

A very desirable feature of this device, in addition to its great holding power, is the fact that it occupies no more space than the workpiece itself upon the chuck, and allows the chuck to be loaded to full capacity, the size of the chuck ordinarily being much greater, relative to the workpiece, than as shown in the drawings.

Referring to Figs. 3 and 4, wherein a workpiece W', is illustrated in the form of a flat cylindrical block, it is seen that a modification of the device thus described may be used in which a split steel ring 25 is wedged inwardly upon the workpiece. The ring has a cylindrical central aperture 26 to correspond with the workpiece and a downwardly and inwardly tapered periphery 27. The ring 25 is split at 28, and provided with kerfs, as at 29, and so may contract about the workpiece. An anchoring member is provided in the form of a continuous steel ring 30, having its inner edge 31 tapered to correspond with the periphery 27.

In the operation of this device, the parts are assembled upon the chuck and tapped into firm engagement. The ring 30 is forcibly held by the magnetic chuck upon energization of the latter, and the split ring 25 is drawn forcibly downwardly by the chuck and urged radially inwardly by the tapered surfaces to exert a resultant clamping force upon the workpiece approximately in the direction of the arrows 32.

It will be noted that, in both the form of Figs. 1 and 2 and that of Figs. 3 and 4, the split ring and anchoring member may conveniently be made of very thin stock so that workpieces too thin to be practicably machined by other methods may be effectively worked by the use of my invention.

In Figs. 5 to 8, I have illustrated an embodiment of my invention which is well adapted to hold workpieces having straight edges. In the drawings I have illustrated two of the clamping devices holding a workpiece between them, but it will be apparent that one of the devices could hold the workpiece against a fixed abutment or a blocking piece.

The work contacting member in this embodiment comprises a bar 35 having its outer edge tapered downwardly and inwardly at 36. An anchor bar 37, adapted to be held in place by the magnetic chuck, has its inner edge formed with a mating taper at 38. When the magnetic chuck is activated, the bar 37 is rigidly held and the bar 35 is drawn forcibly downwardly and inwardly with a resultant clamping force against the workpiece approximately in the direction of the arrow 39.

The inner edge of the bar 35 may be grooved and an elastic insert, such as a plastic rod 40, may be cemented or crimped therein for the protection of workpieces which are easily marred.

The clamping action of the bar 35 may be augmented by that of auxiliary bar 45, both the inner and outer edges of which are tapered to coact respectively with a second tapered edge of the bar 37, and the tapered inner edge of a plate 46. In this design, the bar 37 is preferably of non-magnetic material so that it may slide laterally on the energized chuck. The plate 46 provides an anchorage for the device and the bar 37 is caused to slide slightly as the wedge 45 is drawn downwardly by the chuck. The movement of the bar 37 is thus added to the wedging action of the bar 35. The required amount of movement may thus be obtained even though the tapering of the various edges is made very slight to obtain a large amount of horizontal thrust with a given strength of magnet.

The various bars and plates of Figs. 5 and 6 are preferably joined as a unitary device to facilitate their use. As illustrated in the drawings, this may be accomplished by the provision of headed rods 50 anchored in one of the members and passing through suitable apertures in the others. A compression spring 51 is interposed between the head of each rod and plate 46 whereby the members are normally held in idle position with the bars 35 and 45 standing substantially higher than the other members so that the required amount of horizontal movement may be obtained when the magnetic chuck is energized. This relationship of the members, when idle, is preferably obtained by means of light leaf springs, as shown. The rod clearing opening 52 of the bar 45 is elongated in a vertical direction to allow relative vertical movement. A leaf spring 53, suitably anchored within the bar, presses downwardly upon the rod 50 and so biases the bar 45 toward its uppermost position. The aperture 53, in the bar 37, is similarly elongated and a leaf spring 55, beneath the rod, normally urges the rod, and thereby the bar 35, to its uppermost position.

In the operation, the clamp of Fig. 5 is laid upon the magnetic chuck and pushed against the workpiece, the various members of the clamp being in their staggered and idle positions as just described. The parts may then be lightly tapped into firm engagement and, when the magnetic chuck is energized, the plate 46 becomes firmly anchored and the bars 35 and 45 are drawn forcibly downwardly to wedge the workpiece securely.

It will be noted that in this form, as well as in the two preceding ones, the members comprising a clamp need be no thicker than the plain, and less effective, blocking pieces which would ordinarily be employed to hold the same workpiece against lateral shifting only.

The three forms of clamp which I have illustrated are well adapted to the usual magnetic chuck having a flat upper surface. In the case of quantity production of a particular workpiece, however, a chuck could be designed with a beveled shoulder, circular for the first two workpieces illustrated herein and straight for the third. With such a chuck, the anchoring member of the clamp would be dispensed with.

While I have illustrated specific embodiments of my invention, I do not wish to be limited thereby as it will be apparent that numerous changes and modifications may be made within the spirit and scope of my invention.

I claim:

1. A device for clamping a workpiece having an opening upon a magnetic chuck comprising, a member of magnetic material adapted to be securely held by the chuck, a beveled periphery on said member, an expansible member of magnetic material adapted to be drawn to the chuck and provided with an opening, an outer edge on said expansible member adapted to engage the workpiece, and a beveled inner edge on said expansible member conforming to the beveled periphery of the first-named member.

2. A device for clamping a ring-shaped workpiece upon a magnetic chuck having a conical protuberance thereon comprising, a split ring of magnetic material adapted to fit within the workpiece and to be drawn to the chuck, and a conical inner edge conforming to the protuberance for coaction with the protuberance to expand the ring.

3. A device for clamping a ring-shaped workpiece upon a magnetic chuck comprising, a disc of magnetic material adapted to be securely held by the chuck, a beveled edge on said member, a split ring of magnetic material adapted to fit within the workpiece and to be drawn to the chuck, and a beveled inner edge on said split ring conforming to the beveled edge of the disc.

4. A device for clamping a disc-shaped workpiece upon a magnetic chuck having a beveledged recess therein comprising, a split ring of magnetic material adapted to fit around the workpiece and to be drawn to the chuck, and a beveled periphery on said ring conforming to the beveled edge of the recess.

5. A device for clamping a disc-shaped workpiece upon a magnetic chuck comprising, a ring of magnetic material adapted to be securely held by the chuck, a beveled inner edge on said ring, a split ring of magnetic material adapted to fit around the workpiece and to be drawn to the chuck, and a beveled outer edge on said split ring conforming to the beveled edge of the first-named ring.

6. A device for clamping a workpiece upon a magnetic chuck comprising, a plate of magnetic material adapted to be securely held by the chuck, a beveled edge on said plate, a bar of magnetic material adapted to be drawn to the chuck, a beveled edge on said bar for coaction with the beveled edge of the plate to move the bar laterally as it is drawn to the chuck, and a second edge on the bar adapted to engage the workpiece.

7. A device for clamping a workpiece upon a magnetic chuck having an upstanding beveled shoulder thereon comprising, a bar of non-magnetic material, two beveled edges on said bar, a second bar of magnetic material adapted to be drawn to the chuck, two beveled edges on said second bar adapted to engage respectively the shoulder on the chuck and one beveled edge of the first bar, a third bar of magnetic material adapted to be drawn to the chuck and to engage the workpiece, and a beveled edge on the third bar adapted to engage the other beveled edge of the first bar, the lateral thrusts upon the three bars due to the beveled edges as the second and third bars are drawn to the chuck being additive to clamp the third bar against the workpiece.

8. A device for clamping a workpiece upon a magnetic chuck comprising, a plate of magnetic material adapted to be securely held by the chuck, a beveled edge on said plate, a bar of non-magnetic material, two beveled edges on said bar, a second bar of magnetic material adapted to be drawn to the chuck, two beveled edges on said second bar adapted to engage respectively the beveled edge of the plate and one beveled edge of the first bar, a third bar of magnetic material adapted to be drawn to the chuck and to engage the workpiece, a beveled edge on the third bar adapted to engage the other beveled edge of the first bar, and resilient means adapted to retain the plate and bars in mutual engagement, the lateral thrusts upon the three bars due to the beveled edges and in opposition to said resilient means as the second and third bars are drawn to the chuck being additive to clamp the third bar against the workpiece.

9. A device for clamping a workpiece upon a magnetic chuck comprising, a plate of magnetic material adapted to be securely held by the chuck, a beveled edge on said plate, a bar of non-magnetic material, two beveled edges on said bar, a second bar of magnetic material adapted to be drawn to the chuck, two beveled edges on said second bar adapted to engage respectively the beveled edge of the plate and one beveled edge of the first bar, a third bar of magnetic material adapted to be drawn to the chuck and to engage the workpiece, a beveled edge on the third bar adapted to engage the other beveled edge of the first bar, a rod, resilient means acting longitudinally of the rod to urge the plate and bars into mutual engagement, and other resilient means acting transversely of the rod to urge the plate and bars into staggered relationship, the beveled edges inducing lateral thrusts upon the three bars in opposition to the first-named resilient means as the second and third bars are drawn to the chuck in opposition to the second-named resilient means, the lateral thrusts being additive to clamp the third bar against the workpiece.

10. A device for clamping a workpiece upon a magnetic chuck comprising, a tapered shoulder on the chuck, a member of magnetic material adapted to be drawn toward the chuck, a tapered edge on said member to coact with said tapered shoulder, the respective tapers extending in the direction to force the member laterally in the direction away from the shoulder as it moves toward the chuck, and a second edge on the member to engage the workpiece.

11. A device for clamping a workpiece upon a magnetic chuck comprising, a member of magnetic material adapted to be firmly held by the chuck, a tapered edge on said member, a second member of magnetic material adapted to be drawn toward the chuck, a tapered edge on said second member complementary to the tapered edge on the first member, and adapted to coact therewith, the direction of the tapers being simultaneously toward the workpiece and the chuck, and a second edge on the second member adapted to engage the workpiece.

12. A device for holding a work piece upon a magnetic chuck comprising a split annular member of magnetic material, an abutment member having an edge adapted to engage an edge of the annular member, the coacting edges of the two members being complementarily inclined whereby magnetic action may alter the shape of the split annular member sufficiently to cause the other edge thereof to clamp against the work piece.

13. A device for holding a work piece upon a magnetic chuck comprising a split annular member of magnetic material, an abutment of magnetic material having a circular edge adapted to engage one of the circular edges of the annular member, the coacting edges of the two members being inclined in a direction toward both the work piece and the face of the chuck, whereby magnetic action may cause the other circular edge of the annular member to engage the work piece and clamp it on the chuck.

14. A device for clamping a work-piece upon a magnetic chuck comprising an abutment freely movable on the chuck when not magnetized but adapted to be magnetically retained in position by the chuck when magnetized, and a magnetically actuatable movable member between the abutment and work-piece and having an inclined coaction with the abutment whereby it is adapted to be magnetically movable into binding engagement with the work-piece while the member reacts against the abutment.

15. A device for clamping a work-piece upon a magnetic chuck comprising means adapted to be magnetically held on the chuck to form abutments on opposite sides of the work-piece, means for tying together such abutments to prevent a relative shifting of the abutment on one side with reference to that of the other side, and means having an inclined coaction with said abutments whereby it is adapted to be magnetically moved into binding engagement with the work-piece.

16. A device for clamping a workpiece having an opening therein upon a magnetic chuck comprising a tapered protuberance adapted to be held to the chuck and an expansible member of magnetic material adapted to be drawn toward the chuck, an outer edge on said member adapted to engage the workpiece within the opening, and a tapered inner edge on said member adapted to coact with the tapered protuberance.

JOHN E. GILES.

REFERENCES CITED

The following references are of record in the file of this patent:

UNITED STATES PATENTS

| Number | Name | Date |
| --- | --- | --- |
| 449,039 | Fietsch | Mar. 24, 1891 |
| 1,146,867 | Griffith | July 20, 1915 |
| 1,330,558 | Simmons | Feb. 10, 1920 |
| 1,471,624 | Morton | Oct. 23, 1923 |
| 1,705,643 | Okochi et al. | Mar. 19, 1929 |
| 2,327,748 | Smith | Aug. 24, 1943 |